United States Patent
Siebert

(10) Patent No.: US 9,619,930 B2
(45) Date of Patent: Apr. 11, 2017

(54) LIGHT TRANSPORT SIMULATOR AND METHOD OF CONSTRUCTION AND CLASSIFICATION OF LIGHT TRANSPORT PATHS

(71) Applicant: Nvidia Corporation, Santa Clara, CA (US)

(72) Inventor: Daniel Siebert, Berlin (DE)

(73) Assignee: Nvidia Corporation, Santa Clara, CA (US)

( * ) Notice: Subject to any disclaimer, the term of this patent is extended or adjusted under 35 U.S.C. 154(b) by 428 days.

(21) Appl. No.: 13/886,555

(22) Filed: May 3, 2013

(65) Prior Publication Data

US 2014/0327672 A1    Nov. 6, 2014

(51) Int. Cl.
*G06T 15/50*    (2011.01)

(52) U.S. Cl.
CPC .................... *G06T 15/506* (2013.01)

(58) Field of Classification Search
None
See application file for complete search history.

(56) References Cited

U.S. PATENT DOCUMENTS

| | | | | |
|---|---|---|---|---|
| 2008/0018647 | A1* | 1/2008 | Bunnell | 345/426 |
| 2011/0043516 | A1* | 2/2011 | Shirley et al. | 345/419 |
| 2012/0038643 | A1* | 2/2012 | Keller et al. | 345/426 |
| 2012/0256939 | A1 | 10/2012 | Kulla et al. | |

OTHER PUBLICATIONS

Kollig et al.;"Efficient Bidirectional Path Tracing by Randomized Quasi-Monte Carlo Integration"; 2002; Springer Berlin Heidelberg; p. 1-16.*
Heckbert, Paul S. "Adaptive Radiosity Textures for Bidirectional Ray Tracing." ACM SIGGRAPH Computer Graphics 24.4 (1990): 145-154.
Suykens, Frank. "On robust Monte Carlo algorithms for multi-pass global illumination." status: published (2002).
P-C Wu , F-J Wang and K-R Young "Scanning Regular Languages by Dual Finite Automata", ACM Sigplan Notices, vol. 27, No. 4, pp. 12-16 19 (Abstract Copy).

* cited by examiner

*Primary Examiner* — Peter Hoang
(74) *Attorney, Agent, or Firm* — Kevin Brown; Parker Justiss, P.C.

(57) ABSTRACT

A light transport simulator and a method of constructing and classifying light transport paths. One embodiment of the light transport simulator includes a light transport simulator operable to construct and classify a light transport path between two points in a scene, including: (1) a memory configured to store dual deterministic finite automata (DFA) based on an LPE that defines criteria for accepting the light transport path, and (2) a processor configured to employ the dual DFA to construct opposing light subpaths originating from the two points, and employ a correspondence among states of the dual DFA to unite the opposing light subpaths to form the light transport path.

22 Claims, 4 Drawing Sheets

LIGHT TRANSPORT SIMULATOR AND METHOD OF CONSTRUCTION AND CLASSIFICATION OF LIGHT TRANSPORT PATHS

TECHNICAL FIELD

This application is directed, in general, to light transport simulation and, more specifically, to the constructing and classifying of light transport paths using light path expressions (LPE).

BACKGROUND

It is often desirable to modify the output of a physically based renderer that simulates light transport in a virtual scene. Many times the image generated by the renderer contains all the desired effects and looks roughly correct, but some amount of emphasis or adjustment is desired. Rather than re-render the scene, which can become costly if abused, the image can be manipulated through an "image composition" process that allows a user to manipulate less desirable effects without disrupting desirable effects. One tool available in image composition is light path expressions (LPE). LPEs are regular expressions adapted for light transport simulation.

Many physically based renderers generate light transport paths by projecting rays from a camera or light source, and importance-sampling or evaluating some or all components of the surface properties of the scene geometry. An LPE is a regular expression that defines characteristics of the light transport paths such that it catches paths matching those characteristics, or "criteria," but not others, like a filter. Such criteria include the type of camera, lens, light source shape, light source type, emission characteristics and surface characteristics, among others. For example, LPEs can distinguish between a light transport path colliding with a diffuse surface versus a glossy surface. LPEs can also distinguish between a light transport path that experiences reflection versus refraction. Typically, light transport paths that match the LPE are evaluated and the results written to a buffer designated for the LPE.

SUMMARY

One aspect provides a light transport simulator operable to construct and classify a light transport path between two points in a scene. In one embodiment, the simulator includes: (1) a memory configured to store dual deterministic finite automata (DFA) based on an LPE that defines criteria for accepting the light transport path, and (2) a processor configured to employ the dual DFA to construct opposing light subpaths originating from the two points, and employ a correspondence among states of the dual DFA to unite the opposing light subpaths to form the light transport path.

Another aspect provides a method of constructing and classifying a light transport path between two points. In one embodiment, the method includes: (1) constructing an obverse light subpath originating from a first of the two points based on an obverse DFA, (2) constructing a reverse light subpath originating from a second of the two points based on a reverse DFA, and (3) uniting the obverse light subpath and the reverse light subpath into the light transport path according to a correspondence among states of the obverse DFA and the reverse DFA, such that the light transport path is valid with respect to a LPE from which the obverse DFA and the reverse DFA are derived.

Yet another aspect provides a method of light transport simulation. In one embodiment, the method includes: (1) creating a LPE that defines criteria for accepting a light transport path between a viewpoint and light source into a solution, (2) building obverse and reverse automata based on the LPE that represent potential light transport paths originating from both of the viewpoint and light source, yielding a correspondence among states of the obverse and reverse automata, (3) employing the obverse and reverse automata in constructing opposing light subpaths originating from the viewpoint and light source, and (4) uniting the opposing light subpaths to form the light transport path according to the correspondence.

BRIEF DESCRIPTION

Reference is now made to the following descriptions taken in conjunction with the accompanying drawings, in which.

DETAILED DESCRIPTION

Figure 1:
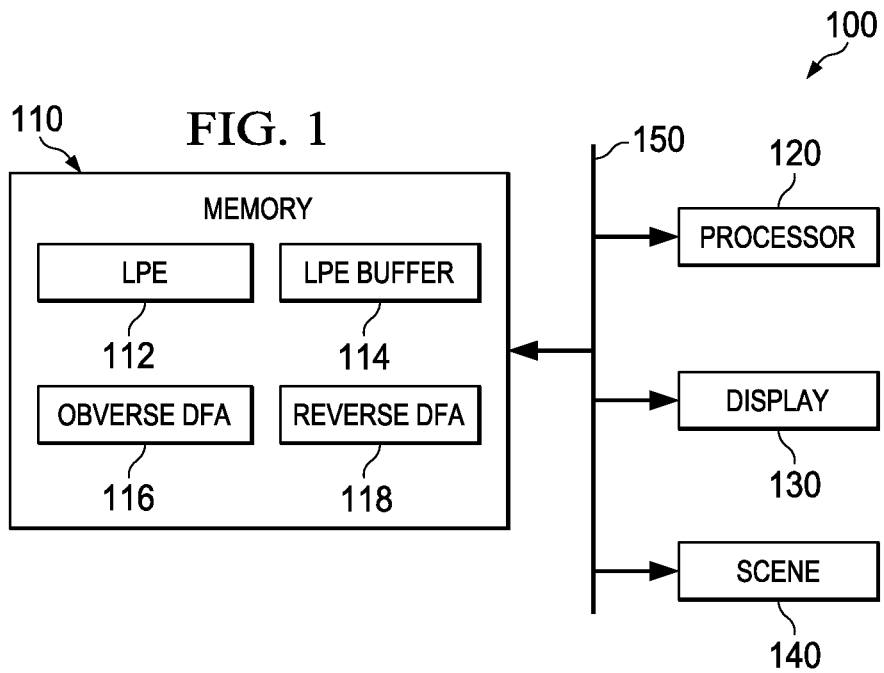
FIG. 1 is a block diagram of one embodiment of a light transport simulator.

Physically based renderers for simulating light transport (also known as light transport simulators) often implement LPEs using finite state automata, or state machines. Finite state automata, and, more specifically, a deterministic finite automaton (DFA) is a state machine implemented in a processor for carrying a computation, sequential logic, or a computer program, among other uses. At any given point in time, the DFA is in only one state, which is known as its current state. The DFA transitions between or among states upon triggering events or conditions.

A DFA can be constructed as an exact machine-usable representation of an LPE. When light interacts with surfaces in a scene, a scene material description dictates the kinds of light transport that can be simulated. The possible transitions out of the current state in the DFA dictate which kinds of light transport are of interest. During light transport simulation, the DFA is used to construct light transport paths between a viewpoint, or camera, and a light source. The DFA starts at one point, usually either the viewpoint or the light source, and maps the possible transitions and states according to the LPE.

For example, a first subpath edge is generated originating at the starting point and arriving at some geometry or surface in the scene. Depending on the geometry's characteristics, its interaction with light is evaluated and another subpath edge joins the first subpath edge at a subpath vertex. The second subpath edge extends from the subpath vertex to another geometry in the scene. Each subpath edge represents a transition, or light interaction, and the subpath vertex represents a state, or surface. Light interactions are characterized by a bidirectional scattering distribution function (BSDF), an emissive distribution function (EDF) or a volume phase function. A state is transitioned into by evaluating or importance sampling the light interaction that composes the transition for that particular state. The same is true for transitioning out of that state and into another. This is akin to, for example, a light ray colliding with a diffuse surface and reflecting off in some fashion. The surface could have multiple properties, for example, it could also have a glossy reflection component. In that case, there are at least two transitions out of the state, that is the diffuse glossy surface.

A terminated light subpath, or a light transport path, which is a path that reaches the viewpoint if originating at the light source and a path that reaches the light source if originating at the viewpoint, can be evaluated against the LPE, or "classified." If the transitions composing the light transport path meet the criteria of the LPE, the path is accepted into the solution and the path itself can be evaluated and its results stored in a buffers for later use.

It is realized herein that use of dual DFAs allows LPE classification concurrent with light transport path construction. Every DFA can be reversed, such that the resulting reverse automaton accepts the exact reverse language of the original, or obverse language. In this case, the words of the language are light transport paths. It is realized herein that by using an obverse automaton and a reverse automaton, bidirectional light transport simulation can be sped up. Light subpaths can be constructed originating from the viewpoint and the light source, and the LPE can be evaluated in both directions. It is further realized herein the obverse and reverse DFA can be constructed at scene load time rather than at render time, and that construction yields a correspondence among the states of the obverse and reverse DFA. This correspondence allows LPE classification while light transport paths are being constructed.

FIG. 1 is a block diagram of one embodiment of a light transport simulator 100 within which the light transport simulator and method of construction and classification of light transport paths may be embodied or carried out. Renderer 100 includes a memory 110 coupled to a processor 120, a display 130 and scene data 140, via a data bus 150.

Memory 110 is configured to store an LPE 112, an LPE buffer 114, an obverse DFA 116 and a reverse DFA 118. LPE 112 defines the criteria by which light transport paths between two points in a scene are accepted into a solution. Light transport paths are constructed by processor 120 via obverse DFA 116 and reverse DFA 118. LPE 112 is retrieved over data bus 150 and employed in constructing obverse DFA 116 and reverse DFA 118. During construction of obverse DFA 116 and reverse DFA 118, a correspondence among the states of each is ascertained. The correspondence maps potential connections among the states, as well as what buffers results of evaluating connections should be written to, LPE buffer 114 for instance.

Light subpaths originate from both of the two points, which are typically a viewpoint and a light source, ultimately reaching a point where they can be joined, or united to form a light transport path. In certain embodiments, the light subpaths each terminate at some state, or subpath vertex. The correspondence then identifies whether the two termination points are sufficiently close to connect. The connection is formed by evaluating an interaction at the "common," or "fused" subpath vertex. The common subpath vertex is common within some margin, as it is unlikely two opposing light subpaths would terminate at the same point. In other embodiments, the visibility between the terminating subpath vertices is checked, and if not occluded, a connection can be made. The correspondence identifies an interaction from each direction, from the light source to the viewpoint and from the viewpoint to the light source. The interaction is evaluated from both directions to ascertain the light from the light source reaching the light subpath originating at the viewpoint, and the light from the viewpoint reaching the light subpath originating at the light source. The correspondence also specifies a frame buffer, such as LPE 114, to store the respective results of each evaluation.

Obverse DFA 116 or reverse DFA 118 may begin at the light source, and the same is true for the viewpoint, such that obverse DFA 116 begins from one point and reverse DFA 118 begins at the other. Light transport paths meeting the criteria defined by LPE 112 are evaluated by processor 120 and their results stored in LPE buffer 114. LPE buffer 114 and the remainder of scene data 140 are eventually rendered by processor 120 and displayed on display 130. In alternate embodiments, processor 120 can be any processor, including a graphics processing unit (GPU) and a central processing unit (CPU).

Figure 2:
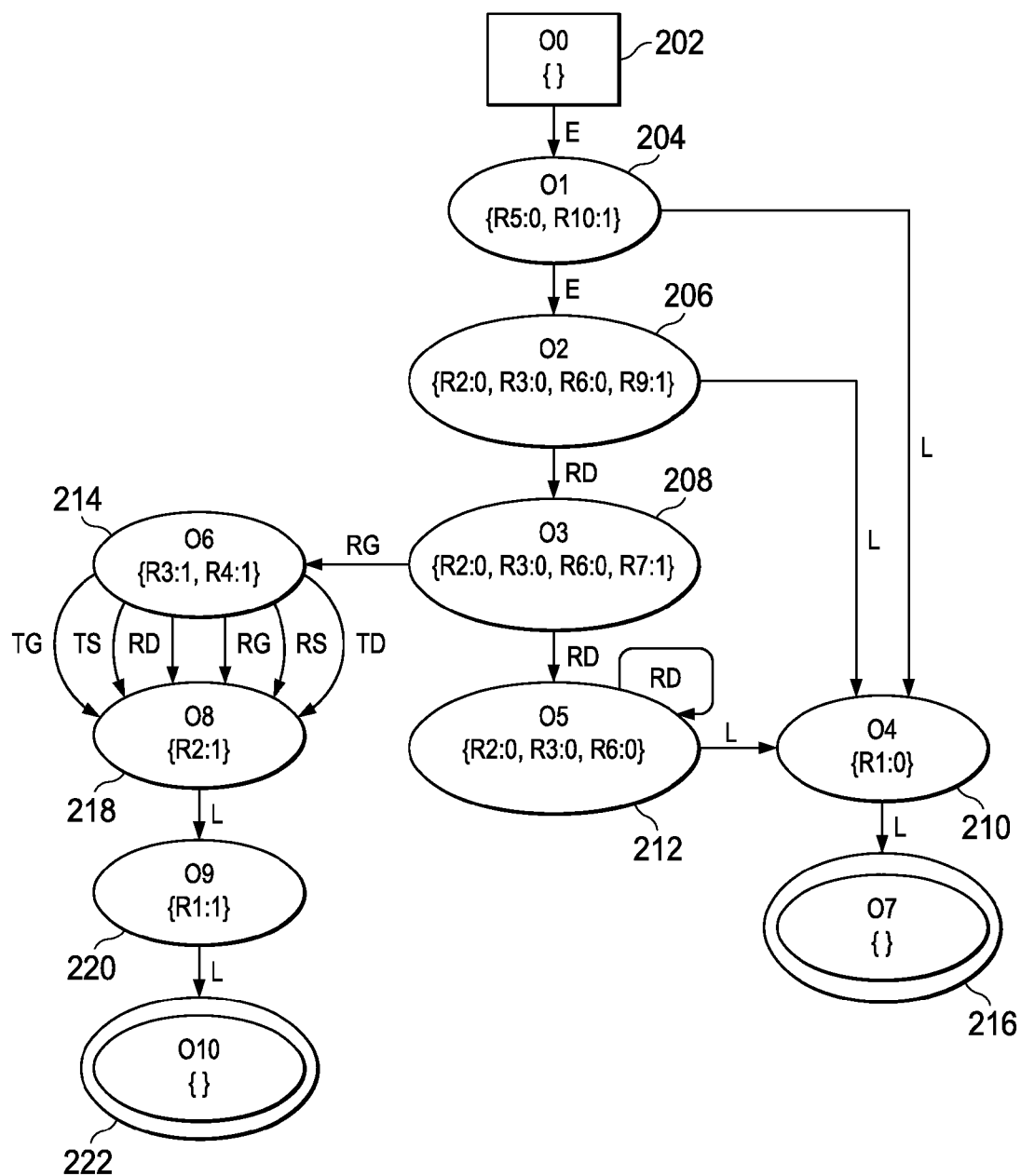
FIG. 2 is a diagram of one embodiment of an obverse automaton.

FIG. 2 is a diagram of one embodiment of an obverse automaton 200 for constructing light transport paths according to a first LPE "E RD*L" for a buffer zero, and a second LPE "E RD RG.L" for a buffer 1. In regular expressions, the dot character means "any character," and the asterisk means "repeat any number of times." The first LPE seeks light that hits the eye and undergoes diffuse reflection any number of times. The second LPE seeks light that undergoes diffuse reflection and glossy reflection, along with any one other transition.

Obverse automaton 200 has eleven states, O0 through O10. Each of the states has a correspondence set that cross references states of a reverse automaton and a buffer designation for results. Obverse automaton 200 provides for construction of a light transport path from a camera at a state O0 202 to a light source, which can be reached at a state O7 216 and a state O10 222.

From state O0 202, a single transition is available to a state O1 204. State O1 204 has a correspondence set {R5:0, R10:1}, which indicates state O1 204 corresponds to a state R5 in a reverse automaton and the result of such a path should be written to buffer zero, and it also corresponds to a state R10 in the reverse automaton and the result of that path should be written to buffer one. The transition from state O0 202 to state O1 204 is designated as "E," which matches the two LPEs for the automaton. "E" is a regular expression representing a particular transition of light (light that hits the eye or camera in this case) that can be evaluated. Each subpath edge that meets the camera has this designation. Similarly, another transition is designated as "L," which identifies subpath edges that reach the light source. Other transitions represented in FIG. 2 include RD for diffuse reflection, RG for glossy reflection, RS for specular reflection, TD for diffuse transmission, TG for glossy transmission and TS for specular transmission. Each of these transitions, or lighting effects, are implemented via a BSDF. These types of transitions are merely examples. The designations for each transition are discretionary and are generally specified by the author of the LPE "alphabet."

Obverse automaton 200 progresses on to a state O2 206, a state O3 208, a state O4 210, a state O5 212, a state O6 214, a state O8 218 and a state O9 220, before arriving at either state O10 222 or state O7 216. Each of the intermediate steps have correspondence sets cross referencing the reverse automaton.

Figure 3:
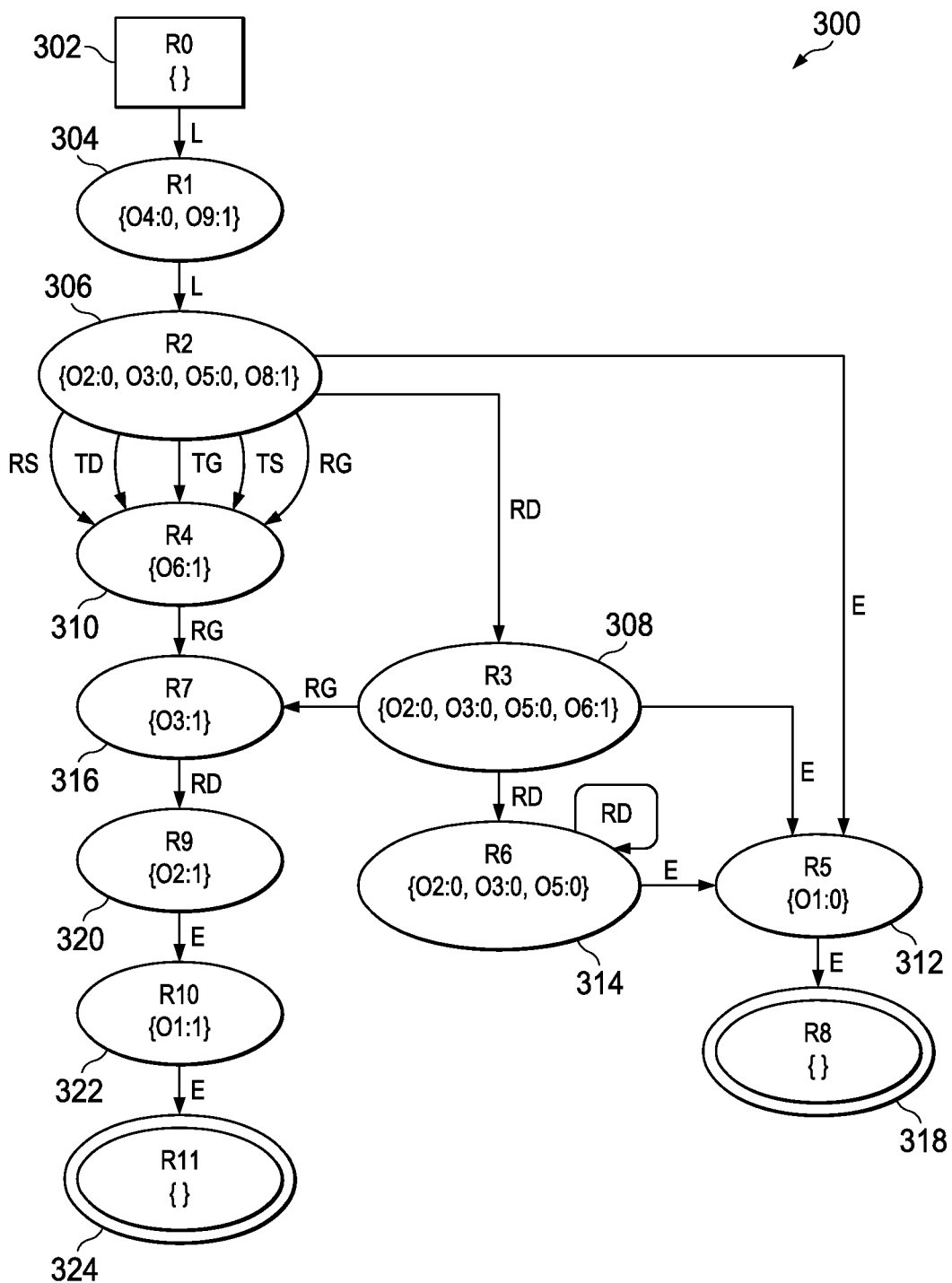
FIG. 3 is a diagram of one embodiment of a reverse automaton with respect to the obverse automaton of FIG. 2.

FIG. 3 is a diagram of one embodiment of a reverse automaton 300 for constructing light transport paths according to the first and second LPEs above and is the compliment of obverse automaton 200 of FIG. 2. Reverse automaton 300 begins at a light source at a state R0 302 and progresses on to a state R1 304, a state R2 306, a state R3 308, a state R4 310, a state R5 312, a state R6 314, a state R7 316, a state R9 320 and a state R10 322. Reverse automaton 300 terminates at a state R8 318 or a state R11 324, where it has reached the camera. As in obverse automaton 200, the intermediate states each have a correspondence set, but in this case, the correspondence set cross references states of obverse automaton 200.

Figure 4:
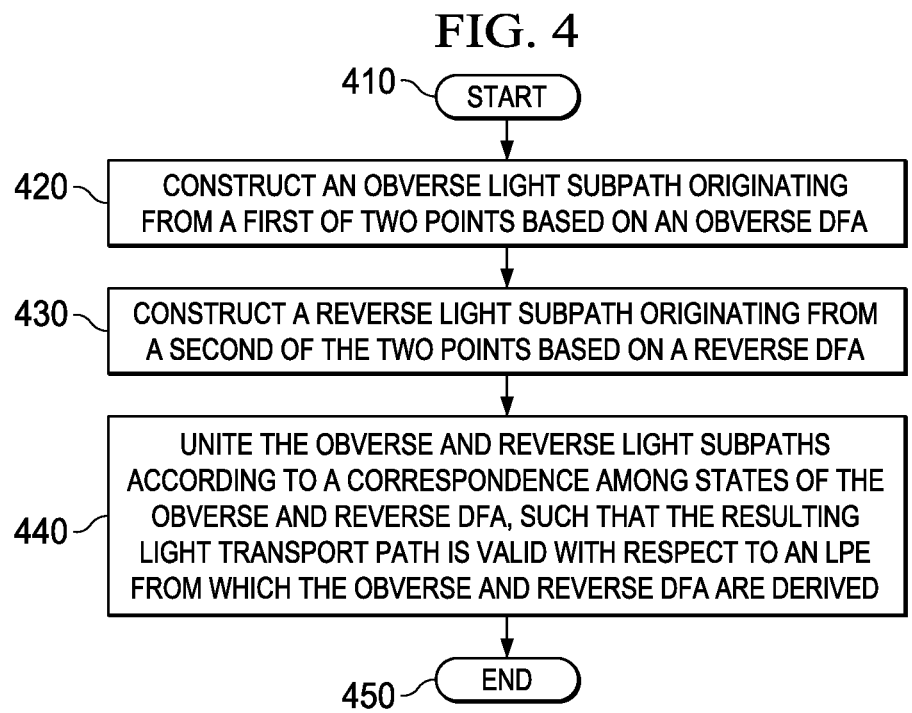
FIG. 4 is a flow diagram of one embodiment of a method of constructing and classifying a light path between two points.

FIG. 4 is a flow diagram of one embodiment of a method for constructing and classifying light transport paths between two points. The method begins in a start step 410. In a first construction step 420, an obverse light subpath is created originating from a first of the two points. The obverse light subpath is created based on the states and transitions defined in an obverse DFA derived from at least one LPE. In a second construction step 430, a reverse light subpath is created originating from a second of the two points. The reverse light subpath is created based on the states and transitions defined in a reverse DFA also derived from the at least one LPE. In alternative embodiments, many subpath edges are pieced together during construction, each two meeting at a subpath vertex that represents a state in the DFA, or a surface in the scene. The number of subpath edges that make up the obverse light subpath can vary randomly, pseudo-randomly, or possibly not at all. Likewise, construction of the reverse light subpath may terminate after any number of subpath edges, often chosen pseudo-randomly.

Continuing the embodiment of FIG. 4, once an obverse and reverse light subpath are constructed and construction terminated, the correspondence sets of their respective current states in the obverse and reverse DFA are checked. If a correspondence exists between the current state of the obverse DFA and the current state of the reverse DFA, then the two paths are connected, or united in a step 440. A connection is made if the terminating subpath vertex of the obverse light subpath is not occluded from the terminating subpath vertex of the reverse light subpath. The connection is made according to the correspondence by evaluating a transition out of the current state of the reverse DFA and another transition out of the current state of the obverse DFA. In alternate embodiments, rather than evaluating the light interaction, transitions can be made by importance sampling the functions characterizing the light interaction. In certain embodiments, the correspondence also specifies where to store the results of each evaluation or importance sampling. The resulting light transport path is such that it satisfies an LPE on which the obverse and reverse DFA are based. The method then ends in an end step 450.

Figure 5:
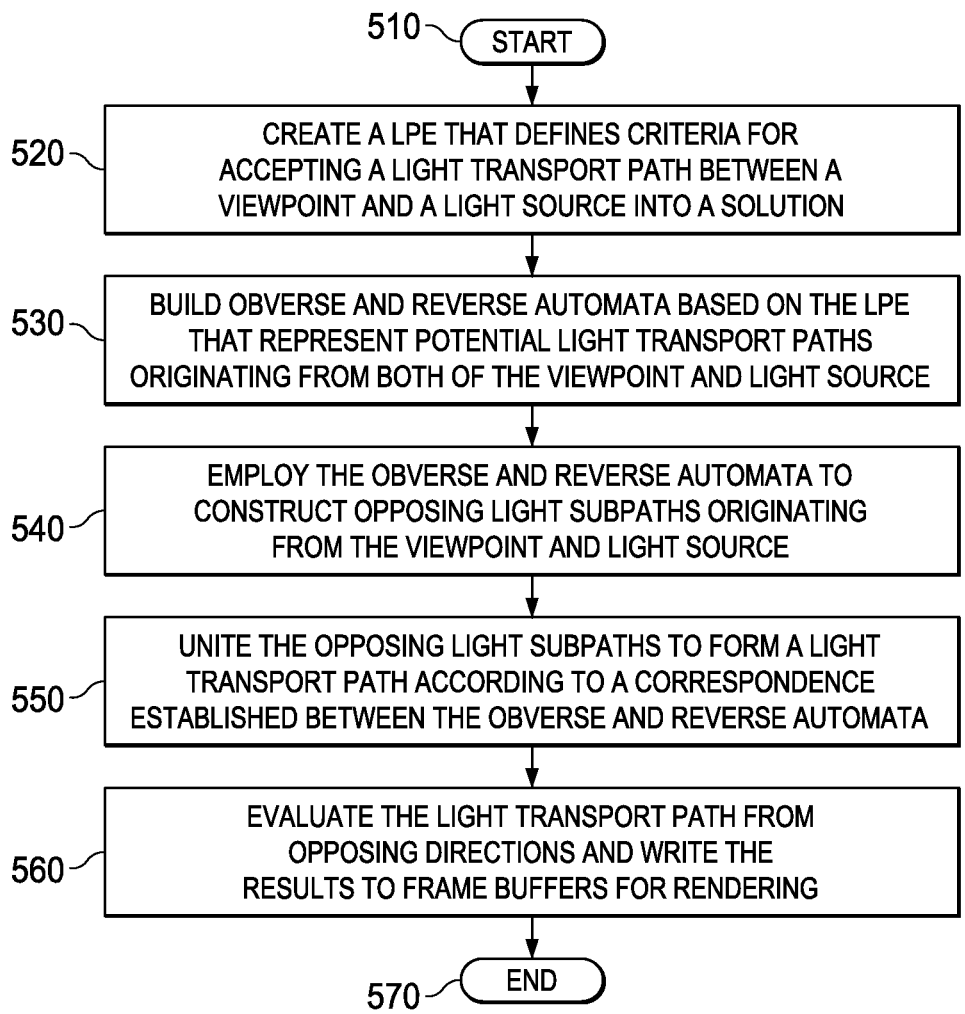
FIG. 5 is a flow diagram of one embodiment of a method of light transport simulation.

FIG. 5 is a flow diagram of one embodiment of a method for light transport simulation. The method begins in a start step 510. In a step 520, an LPE is created that defines criteria for accepting a light transport path between a light source and a viewpoint into a solution. From the LPE, obverse and reverse automata are built in a step 530. The automata represent potential light subpaths that originate from both of the viewpoint and light source. Opposing light subpaths are constructed in a step 540. One light subpath begins at the viewpoint, while the other begins at the light source. Either of the opposing light subpaths may be the obverse, so long as the other is the reverse. The obverse and reverse automata map out the transitions and geometry by which the light subpath propagates through the scene, either from the viewpoint to the light source, or from the light source to the viewpoint.

In a step 550, the opposing light subpaths are united to form a single light transport path according to the correspondence among states of the obverse and reverse automata that is established between the obverse and reverse automata during their construction at step 530. Given the current state of the obverse and reverse automata, the correspondence identifies the transitions and states necessary to connect the obverse and reverse light subpaths while also satisfying the LPE on which the obverse and reverse automata are based. In an evaluating step 560, the united light transport path is evaluated and the results written to the appropriate frame buffers for rendering. In certain embodiments, the appropriate frame buffer is generally identified in the correspondence set for each state in the obverse and reverse automata. The method then ends in an end step 570.

Those skilled in the art to which this application relates will appreciate that other and further additions, deletions, substitutions and modifications may be made to the described embodiments.

What is claimed is:

1. A light transport simulator operable to construct and classify a light transport path between two points in a scene, comprising:
a memory configured to store dual deterministic finite automata (DFA) based on a light path expression (LPE) that defines criteria for accepting said light transport path, wherein said dual DFA are an obverse deterministic finite automaton and a reverse deterministic finite automaton; and
a processor configured to employ said dual DFA to construct opposing obverse and reverse light subpaths originating from said two points, wherein said obverse light subpath is constructed based on states and transitions defined in said obverse deterministic finite automaton and said reverse light subpath is constructed based on states and transitions defined in said reverse deterministic finite automaton, and employ a correspondence between said states of said obverse deterministic finite automaton and said states of said reverse deterministic finite automaton to unite said opposing light subpaths to form said light transport path.

2. The simulator recited in claim 1 wherein said correspondence is set based on cross referencing between said states of said obverse deterministic finite automaton and said states of said reverse deterministic finite automaton.

3. The simulator recited in claim 1 wherein said two points are a light source and a view point.

4. The simulator recited in claim 1 wherein one of said opposing light subpaths includes at least two subpath edges connected at a subpath vertex.

5. The simulator recited in claim 4 wherein said subpath vertex represents a surface in said dual DFA and said subpath edges represent interactions of light incident to and radiating from said surface.

6. The simulator recited in claim 5 wherein each of said interactions is characterized by one selected from the group consisting of:
a bidirectional scattering distribution function (BSDF);
an emissive distribution function (EDF); and
a volume phase function.

7. The simulator recited in claim 1 wherein said processor is further configured to compute said correspondence before rendering.

8. A method of constructing and classifying a light transport path between two points, comprising:
constructing an obverse light subpath originating from a first of said two points based on states and transitions of an obverse deterministic finite automaton (DFA);

constructing a reverse light subpath originating from a second of said two points based on states and transitions of a reverse DFA, wherein said states of said obverse DFA cross reference said states of said reverse DFA to establish a correspondence between said states of said obverse DFA and said reverse DFA; and uniting said obverse light subpath and said reverse light subpath into said light transport path according to said correspondence, such that said light transport path is valid with respect to a light path expression (LPE) from which said obverse DFA and said reverse DFA are derived.

9. The method recited in claim 8 wherein said constructing an obverse light subpath includes importance sampling an interaction to advance from one surface of said obverse DFA to another.

10. The method recited in claim 9 wherein said one surface has a plurality of interactions for advancing according to said obverse DFA and said constructing an obverse light subpath includes selecting one of said plurality at random.

11. The method recited in claim 8 wherein said constructing said reverse light subpath includes: randomly deciding between advancing from a current state of said reverse DFA, which continues said constructing, and stopping at said current state, which terminates said constructing.

12. The method recited in claim 8 wherein said uniting includes:
verifying a last surface along said obverse light subpath is not occluded from a last surface along said reverse light subpath;
determining a first interaction for connecting said obverse light subpath and a second interaction for connecting said reverse light subpath, based on said correspondence; and
evaluating said first interaction and said second interaction.

13. The method recited in claim 12 further comprising storing results of said first interaction and said second interaction in respective frame buffers according to said correspondence.

14. The method recited in claim 8 wherein said uniting includes:
fusing an end obverse subpath vertex and an end reverse subpath vertex;
determining an interaction for the fused vertex based on said correspondence; and
evaluating said interaction.

15. The method recited in claim 8 further comprising building said obverse DFA and said reverse DFA based on said LPE, thereby yielding said correspondence.

16. A method of light transport simulation, comprising:
creating a light path expression (LPE) that defines criteria for accepting a light transport path between a viewpoint and a light source into a solution;
building obverse and reverse automata based on said LPE, having states and transitions that represent potential light transport paths originating from both said viewpoint and said light source, wherein said states of said obverse automaton reference said states of said reverse automaton yielding a correspondence among said states of said obverse and reverse automata;
employing said obverse and reverse automata in constructing opposing light subpaths originating from said viewpoint and said light source; and
uniting said opposing light subpaths to form said light transport path according to said correspondence.

17. The method recited in claim 16 wherein said criteria includes surface characteristics of scene geometry.

18. The method recited in claim 16 wherein said correspondence includes a correspondence state set for each of said obverse and reverse automata.

19. The method recited in claim 16 further comprising evaluating said light transport path from opposing directions and writing the results to frame buffers for rendering.

20. The method recited in claim 19 wherein said building is carried out before said rendering.

21. The method recited in claim 16 wherein said uniting includes:
verifying an end subpath vertex along one of said opposing light subpaths is not occluded from another end subpath vertex along the other;
determining a first interaction and a second interaction for connecting said opposing light subpaths based on said correspondence;
evaluating said first interaction and said second interaction, thereby quantifying light reaching each of said opposing light subpaths from the other; and
storing results from said evaluating in frame buffers specified in said correspondence.

22. The method recited in claim 16 wherein said uniting includes:
verifying an end subpath vertex along one of said opposing light subpaths is near another end subpath vertex along the other of said opposing light subpaths;
determining an interaction shared by said end subpath vertex and said another end subpath vertex based on said correspondence;
substituting a fused vertex for said end subpath vertex and said another end subpath vertex; and
evaluating said interaction and storing results in a frame buffer specified in said correspondence.

* * * * *